United States Patent [19]

Palmer et al.

[11] 4,302,267
[45] Nov. 24, 1981

[54] OPTICAL FIBER MATING APPARATUS AND METHOD

[75] Inventors: John P. Palmer, Pomona; Phillip B. Ward, Jr., Brea, both of Calif.

[73] Assignee: General Dynamics, Pomona Division, Pomona, Calif.

[21] Appl. No.: 123,035

[22] Filed: Feb. 20, 1980

[51] Int. Cl.³ .......................... B65H 9/00; G02B 5/14
[52] U.S. Cl. .................... 156/158; 156/304.2; 156/502; 269/37; 269/43; 269/909; 350/96.15
[58] Field of Search ............. 156/159, 158, 304.1, 156/304.2, 544, 502, 304.5, 153, 296; 250/227; 350/96.15, 96.16, 96.20, 96.21, 320; 29/464, 466, 467, 468; 65/4 B, 61; 269/37, 43, 45, 71, 60, 58, 75, 909

[56] References Cited

U.S. PATENT DOCUMENTS

| | | | |
|---|---|---|---|
| 3,466,514 | 9/1969 | Brunner et al. | 318/18 |
| 3,517,904 | 6/1970 | Verchain | 248/32 X |
| 3,555,916 | 1/1971 | Santy | 74/89.15 |
| 3,628,717 | 12/1971 | Lynch et al. | 228/6 |
| 3,800,388 | 4/1974 | Borner et al. | 29/200 P |
| 3,902,784 | 9/1975 | Dakss et al. | 350/81 |
| 3,938,895 | 2/1976 | Bridges et al. | 350/96.21 |
| 3,990,689 | 11/1976 | Eklund, Sr. | 269/71 |
| 4,019,806 | 4/1977 | Fellows et al. | 350/96.21 |
| 4,070,011 | 1/1978 | Glesser | 269/75 |
| 4,126,376 | 11/1978 | Gommel et al. | 350/90 |
| 4,136,929 | 1/1979 | Suzaki | 350/96.15 |
| 4,147,405 | 4/1979 | Spainhour | 350/96.21 |
| 4,193,317 | 3/1980 | Oono | 269/71 |

FOREIGN PATENT DOCUMENTS

| | | | |
|---|---|---|---|
| 54-24539 | 2/1977 | Japan | 350/96.15 |
| 54-118255 | 9/1979 | Japan | 350/96.15 |

OTHER PUBLICATIONS

PCT WO 79/00099 Mar. 8, 1979, Endersz et al., Sweden.

*Primary Examiner*—Michael W. Ball
*Attorney, Agent, or Firm*—Henry M. Bissell; Edward B. Johnson

[57] ABSTRACT

Apparatus and method for aligning a pair of optical fibers wherein a first fiber is positioned in a holder, adjusted along two axes in a plane, and rotated about an axis perpendicular to the plane. A second fiber is mounted in a universal fixture by a first set of adjustable positioning screws opposed to each other in a housing, and a second set of adjustable positioning screws opposed to the first set positioning the housing on an adjustable structure. The optical fibers are brought into position and flush contact effected by the flexibility of the universal fixture. Thereafter the structure is adjusted in a plane defined by two separate axes to effect alignment about the axes, and rotated about the third axis to complete alignment. A laser or other light source and a light sensitive element are utilized to determine when maximum light transmission is achieved, thus signifying proper alignment.

36 Claims, 12 Drawing Figures

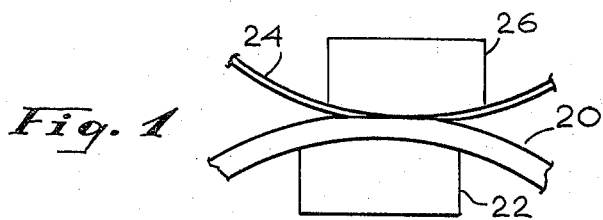
Fig. 1
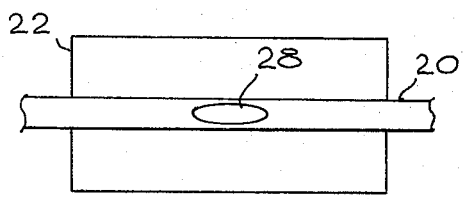
Fig. 2
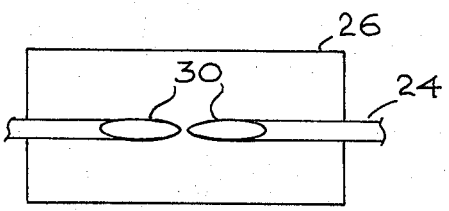
Fig. 3
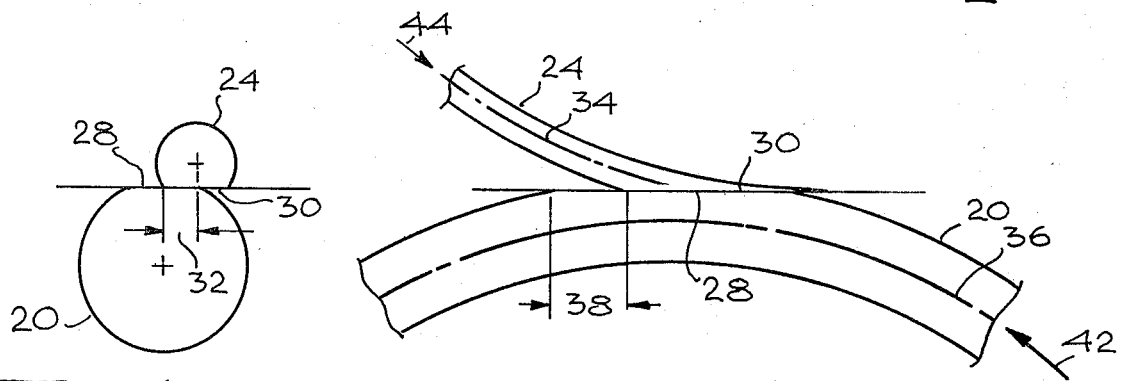
Fig. 4
Fig. 5
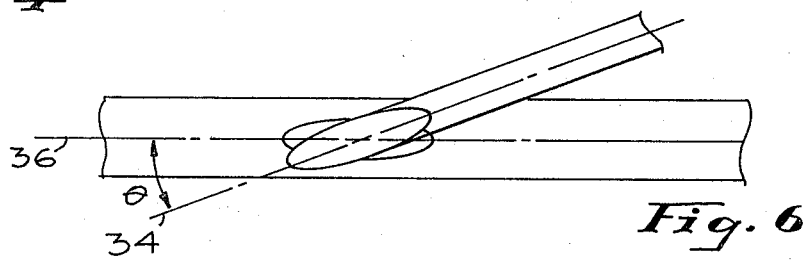
Fig. 6
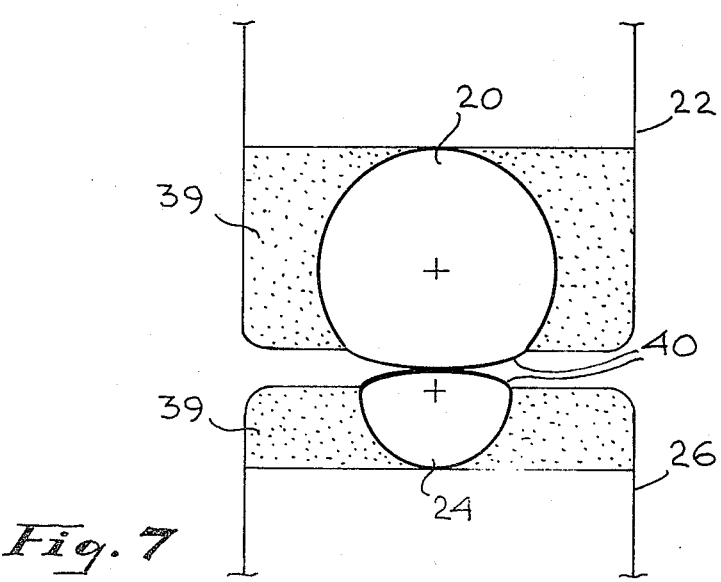
Fig. 7

OPTICAL FIBER MATING APPARATUS AND METHOD

BACKGROUND OF THE INVENTION

1. Field of the Invention

The present invention relates to the field of fiber optics, and more particularly, to methods and apparatus for joining separate optical fibers to provide maximum optical signal throughput. Most particularly the present invention relates to a method and apparatus for manufacturing couplers, especially launch couplers, for use in fiber optic systems.

2. Description of the Prior Art

There are many methods available for the alignment of numerous types of linear rod or tubular structures, and with the advent of fiber optics, in particular, the critical need for alignment of optically active fibers has become quite apparent.

With regard to fiber optics in particular, two different systems appear in the patent art. One exemplary system is the alignment of a fiber within a cylindrical shell, as disclosed in U.S. Pat. Nos. 3,902,784 to Dakss et al and 3,938,895 to Bridger et al. Both of these systems are essentially the same, utilizing a vertical shaft, plural rotating adjustments on the shaft, lower fiber holder, a central tubular shell for holding the fiber and an upper sensor to effect alignment. The Dakss reference uses a microscope as the sensor, while Bridger utilizes a light source and a photosensitive detector to operate a control system. Both systems are capable of alignment in only two planes. The systems thus lack the ability to align couplers and other devices, where alignment in three separate planes is needed.

Another common method for alignment, using eccentric units, is disclosed in U.S. Pat. Nos. 3,800,388 to Borner et al, 4,019,806 to Fellows et al, and 4,147,405 to Spainhour. The Borner reference aligns optical fibers that are eccentrically mounted in rods by positioning two rod and fiber units in a jig, and rotating both of the units until alignment is obtained. Fellows et al, on the other hand, utilizes a V-shaped channel with a shim at one end of the channel to offset one fiber holder from the other and rotates one fiber shaft until alignment is attained. The aligned structure is then clamped in place and the fibers joined. Spainhour utilizes a pair of sleeves to hold two optical fibers for end-to-end alignment, the sleeves are slidably and rotatably mounted in a pair of hinged connecting members. The interplay between the hinging and the adjustability of the fibers in the sleeves allows motion to produce end-to-end alignment. This second method, though it inherently aligns in three directions, does not allow for side-by-side or other fiber alignment where the axes of the fibers are not joined.

Thus there is a need, particularly in the fiber optic art, for a method and apparatus for aligning couplers in which one or both of the fibers are curved, and the joining is along exposed surfaces of the fibers, and not at their ends.

Looking outside of the fiber optic art, exemplary systems for planar alignment can be found in U.S. Pat. Nos. 3,466,514 to Brunner et al, and 4,126,376 to Gommel et al. Both of these patents align two planar surfaces to preselected positions by adjustment in the x and y directions in a plane after placing one planar surface on top of the other. This placement is commonly effected with screws directed toward opposed spring-loaded holders. This type of system does not allow for vertical alignment between the two planar surfaces and does not even consider this important, as the system is directed to planar alignment.

In another system, Sonty in in U.S. Pat. No. 3,555,916, utilizes a pair of wedge-shaped cams to microposition devices in a single plane. Verchain in U.S. Pat. No. 3,517,904 uses plural layers of plates which are independently rotatable in order to obtain displacement in a horizontal plane along with linear horizontal displacement. Finally, patent U.S. Pat. No. 3,628,717 of Lynch et al positions and aligns semiconductor chips, utilizing adjustment in all three directions, i.e. the x, y and z axes, but does not allow for rotational adjustment as this is unnecessary for semiconductor chips. Thus, these prior art systems, though they allow for multidirectional alignment, still are not adaptable to precise directional alignment or linear alignment in all three directions, or rotational orientation of two surfaces which is of great importance when aligning rods or fibers.

SUMMARY OF THE INVENTION

The present invention, in particular, defines a method of orienting two linear elements. The linear elements are usually optical fibers and they are aligned utilizing an apparatus that holds each of the two fibers and adjusts them independently. One fiber is mounted on a jig and extends outward from it in a normally horizontal direction. The jig for this first fiber is provided with, for instance, a micrometer screw, offset from the axis of rotation of the apparatus, that mates with a splined shaft. The screw and splined shaft arrangement allows for rotation of the fiber toward or away from parallel orientation with the base of the apparatus. In addition, optional coarse adjustments can be made on the vertical stand which is used to position the remainder of the structure. The stand can be provided with vertical adjusting bands or a rack and pinion gear arrangement to allow this coarse adjustment, if desired. Finally, the first fiber holding side of the unit can also be provided with micrometer screw adjusters to fine position the fiber vertically and horizontally. The vertical adjustment duplicates the coarse adjustment and moves the fiber perpendicular to the base.

The second half of the unit of the present invention includes a base structure that is, optionally, vertically adjustable. At least one of the three vertical adjustments, the two on the first jig and the optional adjustment on the second half of the unit, must be provided, and at least one of these must be micrometer controlled to give fine adjustment capability. A mounting structure having the capability of being adjusted in a horizontal plane is attached to the base. This horizontal adjustment, which would be parallel to the horizontal adjustment in the first section, is optional. However, at least one of the two horizontal adjustments must be provided. A horizontal adjustment tending to move the second fiber toward and away from the first fiber is necessary for positioning the fibers in contact with each other, and the second horizontal adjusting direction is needed to align the contact surfaces. Above these two adjusting units is a micrometer adjusting unit which is off-centered and operated, for example, by a splined shaft which serves to rotate mounting bracket about a vertical axis. The mounting bracket is fixed to a universal structure for holding the second fiber.

The universal structure utilized in accordance with the present invention includes opposed mounting arms having set screws or other fixtures which position a container snugly, but allow the central container to rotate about the axis of the two positioning screws with the application of slight pressure. The central container has a pair of screws or other positioning pins which abut directly against a fiber holder. The central screws are opposed to each other and, along with the other pair of screws, define a plane. Also, a line drawn between the outer screws would intersect a line drawn between the inner or central screws at 90°. The structure acts like a universal joint, allowing rotation about two axes.

In operation, generally, the fibers are mounted in the above-described holding structure, and coarse vertical adjustment is made on the first side. The units are then moved together, for example, by moving one unit on a track, and the universal joint fixture produces planar contact between the surfaces of the two fibers. Thereafter, rotation of the contacted fibers is effected, utilizing the micrometers to align the two fibers such that the axes thereof form a single plane, and micrometer adjustments are made to adjust and align the fibers by motion of one fiber along the axis of the second fiber and by moving the fibers so that they are aligned in a direction perpendicular to the axis of the fibers, and the axis of rotation.

Preferably, the alignment in these three directions, i.e. rotational, linear and axial, is verified by means of a laser beam directed into the end of one of the fibers, and a photosensitive element positioned to receive the transmitted light signal from the output of the other fiber. A microscope and a visible light source may also be used. The two fibers are then adhered together, most preferably with an optically clear epoxy resin, which is allowed to set while the fibers are maintained in the aligned position. The fibers are then ready to be removed from the apparatus and utilized as, for example, a unidirectional or bi-directional coupler in fiber optics.

BRIEF DESCRIPTION OF THE DRAWINGS

A better understanding of the present invention may be had from a consideration of the following detailed description, taken in conjunction with the accompanying drawings in which:

FIG. 1 is a schematic of the preferred fiber optic coupler structure;

FIG. 2 is a top view of one of the fibers;

FIG. 3 is a top view of the second fiber;

FIG. 4 is a schematic showing axial misalignment;

FIG. 5 is a schematic showing linear misalignment;

FIG. 6 is a schematic showing rotational misalignment;

FIG. 7 is an exaggerated schematic of the surface contact in the axial direction;

DESCRIPTION OF THE PREFERRED EMBODIMENTS

Figure 8:
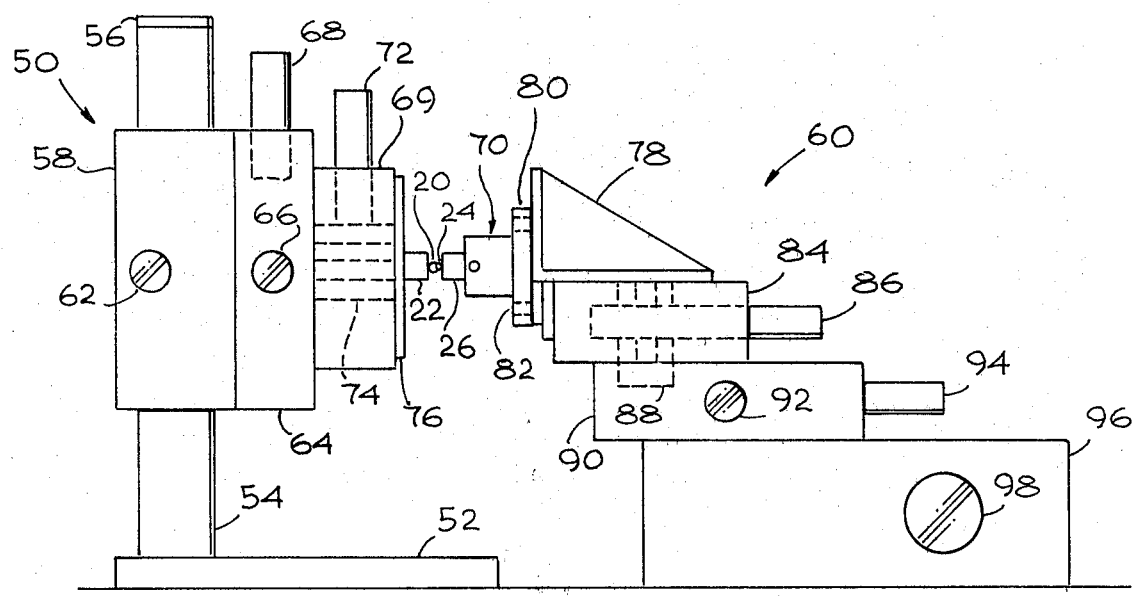
FIG. 8 is a side view of particular apparatus of the invention.

A unidirectional launch coupler is schematically shown in FIG. 1, after eliminating the optically clear resin, and showing the fibers, which are usually coated glass-clad glass fibers, as a single entity. In this figure throughput fiber 20 has been mounted on retaining block 22 which is preferably aluminum, but could be any desired metal or resin so long as it properly holds and positions the fiber upon mounting, and functions appropriately in the apparatus which is described hereinbelow. Launch coupler fiber 24 is mounted on block 26 which is of the same nature as block 22. Thus, as can been seen in the drawings, launch coupler fiber 24 is severed in its center area and contact is only made at one-half of the fiber, as hereinbelow described.

The particular launch coupler illustrated in FIG. 1 is further defined in applicants, co-pending application Ser. No. 123,034, filed concurrently herewith, entitled OPTICAL FIBER LAUNCH COUPLER, assigned to the assignee of this application. As more particularly described therein, the fibers are of different diameters and are normally glass-clad glass fibers of up to about 400 microns in core diameter. The present invention is not limited to the production of these launch couplers, but the method and apparatus are also effective to produce other unidirectional and bi-directional couplers, such as those produced by fusing or by joining a U-shaped fiber to a flat or curved fiber. The limitation is usually that the surfaces of the two fibers that are to be joined should abut each other. The alignment factors and the apparatus are as important in these forms as they are in the improved couplers disclosed in the above-referenced co-pending application. Additionally, the use of the apparatus and method of the present invention is not limited to optical fiber couplers, as the invention may be practiced when joining other structures such as wires, etc.

In FIG. 2, the schematic shows throughput fiber 20 after having been mounted on holding block 22 and lapped in accordance with other known procedures. Flat surface 28, provided by the lapping, is more clearly shown in FIG. 7. For purposes of illustration, in FIG. 2, the epoxy resin which normally is used to hold fiber 20 in place has been deleted, as well as the glass or other cladding over the fiber and any protective coating.

In FIG. 3, upper block 26, shown in FIG. 1, is depicted with lapped launch fiber 24 in position. In this form, again, the protective coating, glass cladding and epoxy resin have been omitted from the drawing. After lapping is completed fiber 24 has two substantially planar surfaces 30 which are elliptical, one of which forms the contact surface for couplers produced in accordance with the present method and apparatus.

FIGS. 4, 5 and 6 show the particular alignments required to perform the steps of the method of the present invention. In particular, FIG. 4 shows throughput fiber 20 having lapped surface 28, and launch fiber 24 having lapped surface 30. As shown, the two fibers are not aligned, the axes of the cores being out alignment by distance 32 indicated by the arrows. Axial alignment, as hereinbelow described, would constitute the reduction of distance 32 to zero or substantially zero, so that the axes of the two fibers are aligned at the interface of the two flat surfaces. In the preferred form of this structure, the axial widths of surfaces 28 and 30 would be equal In FIG. 5, the longitudinal orientation along the axes of the two fibers is shown. In this figure, launch fiber 24 having center line 34 is positioned against throughput fiber 20 having center line 36. Longitudinal motion of the fibers, as shown in the drawing, will adjust and eliminate deviation distance 38, which is the amount fiber 24 should be moved to the left to align the two flat fiber surfaces. Most preferably, the longitudinal dimensions of the faces of surfaces 28 and 30 would be equal as well.

In FIG. 6, rotational alignment is shown. The fiber is not rotationally aligned as shown in FIG. 6 except at its center point, where center lines 34 and 36 cross. Axial alignment, as shown in FIG. 4, would appear to be completed and, since angle $\theta$ may well be quite small, longitudinal alignment, as shown in FIG. 5, also appears to be completed. However, in order to complete alignment of surfaces 28 and 30 so that they match each other exactly, angle $\theta$ must be reduced to zero or substantially zero°. This is effected by rotation of the two fibers relative each other.

FIG. 7 is an exaggerated schematic in cross section at a point where launch fiber 24 is lapped to substantially one-half of its total diameter, or at about the middle of one of the elliptical surfaces 30 shown in FIG. 3. Mounting blocks 22 on the throughput fiber and 26 on the launch fiber are shown in this figure, as is epoxy resin 39 which is utilized to hold fiber 20 and 24 in position on mounting blocks 22 and 26. The deviation as shown in the figure is exaggerated, since the curved fiber surfaces 40, shown in the figure, are normally substantially planar. However, in any lapping process there is some variation in the depth of the lapping across the lapped surface and thus the exaggerated surface is used to indicate the need for appropriate alignment in order to maximize the contact at the substantially planar surfaces.

Alignment in according with the process of the present invention involves mounting the lapped fibers in blocks 22 and 26 in the apparatus shown in FIGS. 8–12, and, in particular, mounting the couplers shown in FIG. 1 such that fiber 20 is mounted in the first unit of the system, and fiber 24 is mounted in the universal section. However, either fiber may be mounted on either unit. The two fibers are then positioned, preferably horizontally, in the apparatus and roughly aligned before being brought into contact with each other. After being brought into contact with each other, a laser is actuated to introduce a light beam into the throughput fiber, preferably in the direction of arrow 42, or into the launch fiber in direction of arrow 44, as shown in FIG. 5. A light-sensitive element is placed at the end of fiber 24 when the laser is shown through launch fiber 20, or the positions may be reversed to reflect the amount of coupling produced by the particular positions of the two units. It should be further noted that additional measurements could be taken at the opposite end of throughput fiber 20 when the laser is positioned for transmission pursuant to arrow 42 so that the amount of light transferred to the launch coupler fiber can be measured.

The micrometers described below are utilized to axially align the fibers, and reduce distance 32 in FIG. 4 to zero. The fibers are also longitudinally aligned to reduce distance 38 as shown in FIG. 5 to zero, and adjusted to reduce angle $\theta$ (see FIG. 6) to zero. The adjustments are effected by the use of micrometers provided in the apparatus and, after maximum throughput and coupling have been attained, epoxy resin is applied to the junction. The resin should fill the space between the two fibers as shown in FIG. 7 and is an optically clear resin which has already been mixed with a crosslinking agent and will set through crosslinking of the polymer chains in the mixture. After the resin is cured, and thus solidified, the unit can be removed from the holders. At this point, the optical fiber couplers are essentially complete and are ready for mounting in a housing or other hardware.

It appears that, in practice, axial misalignment as shown in FIG. 4 is the most critical displacement. A displacement of about 0.001 inch will normally decrease coupling efficiency by about 20%. On the other hand, longitudinal displacement, shown in FIG. 5, in the amount of 0.02 inch (20 times the axial displacement) would only decrease coupling efficiency by about 10%. Thus, the most important step in the present process is that of axial alignment. Further, the rotational misalignment shown in FIG. 6 should reasonably approach an angle $\theta$ of 0°. However, a few degrees, up to about 5° or 7°, can be tolerated and will not result in a great decrease in coupling efficiency. The other major problem dealing with coupling efficiency is the protrusion of some of the core slightly above the lapped surface, as shown in FIG. 7. The fibers, when positioned in this manner, are in a somewhat unstable condition, and must be held in place while the epoxy resin cures. Thus, lapping and mounting of the fibers should be done very carefully in order to maximize coupling efficiency.

The plan view of FIG. 8 shows fibers 20, 24 and mounting blocks 22, 26 positioned for alignment, i.e. throughput fiber 20 is mounted on a first alignment structure, indicated generally as 50, and launch fiber 24 is mounted on a second alignment structure, indicated generally as 60. Mounting of the throughput fiber on first alignment structure 50 can be effected by conventional means, such as a recessed holder containing set screws, or a plurality of protrusions with set screws (not shown) or by melting wax and allowing it to harden. In practice, mounting bracket 76 is bolted to splined shaft 74, so that it can be easily removed. The bracket, after removal, is heated on a flat surface and a small amount of wax melted on it. After melting of the wax, the heat is removed and fiber holding block 22 is positioned on the bracket. In this manner, the wax after hardening secures the block to the bracket and positions fiber 20 for alignment. Mounting of launch fiber 24 is effected in accordance with the procedures noted below with regard to FIG. 10-12, since it is mounted in universal unit 70.

Figure 9:
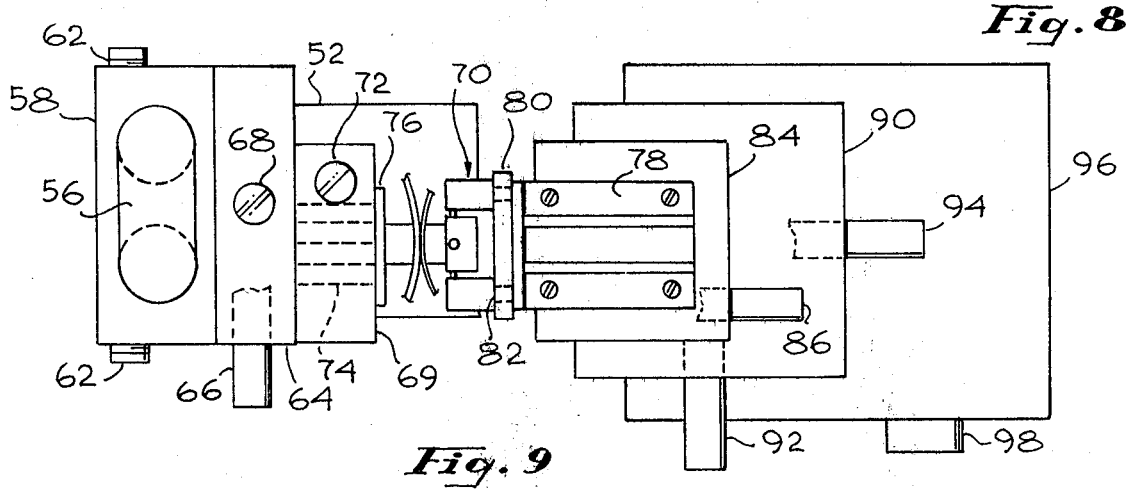
FIG. 9 is a top view of the apparatus of FIG. 8.

First alignment structure 50 consists of base member 52 and vertical support or supports 54. When plural vertical supports are provided, as shown in FIG. 9, cap structure 56 is also provided. However, a single support column or other structure of any appropriate cross-section may be utilized. The remainder of the unit is normally attached to vertical supports 54 by means of coarse vertical adjusting structure 58. In the drawing, as better shown in FIG. 9, a pair of screw adjusters 62 are provided to hold and vertically move the alignment structure on posts 54. This coarse vertical adjustment can be done by way of threaded screws, as shown, or can be effected by a clamping band or other retaining structure. Attached to vertical mounting box 58 is micrometer screw adjuster 64 having two threaded micrometers 66 and 68. Micrometer 66 moves the unit in a longitudinal direction, as better shown in FIG. 9, and micrometer 68 fine adjusts in the vertical direction. For the sake of simplicity, the mounting tracks and the fastening means provided to effect the micrometer adjustments have been deleted. Mounting unit 64 in conjunction with micrometers 66 and 68 and the guides and tracks contained therein may be utilized for alignment in the axial and longitudinal directions, as previously described. However, provision of these fine adjustments on this side of the apparatus is not necessary so long as the same adjustments can be effected on the second half of the unit, as described below.

Rotational adjuster 69, on the other hand, utilizing micrometer screw 72 and splined shaft 74, is necessary on the first adjustable support. As can be better seen in FIG. 9, splined shaft 74 will be driven by micrometer 72 which is off-center, as compared to micrometer adjusters 66, 68 which are centered. Splined shaft 74 is then rotated by the turning of micrometer 72, and in so rotating will adjust the position of mounting bracket 76. Mounting bracket 76 is provided with means, not shown, for the attachment of fiber holder 22, and thus adjustments of micrometers 66, 68 and 72 will perform the fine adjustments described above.

Figure 10:
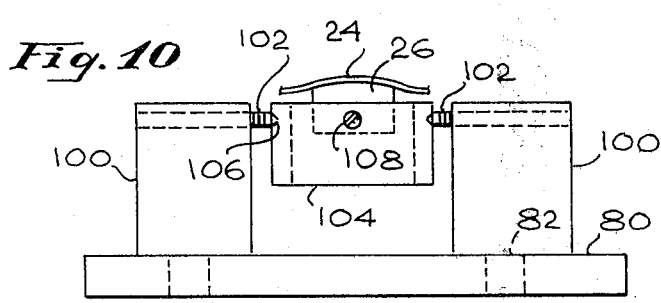
FIG. 10 is a side view of the universal portion of the apparatus.
Figure 12:
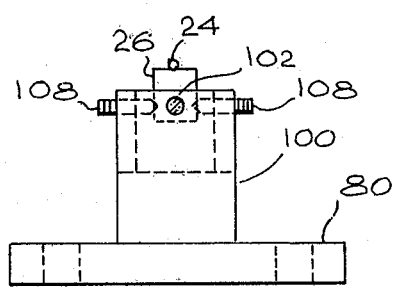
FIG. 12 is an end view of the universal apparatus of FIG. 10
Figure 11:
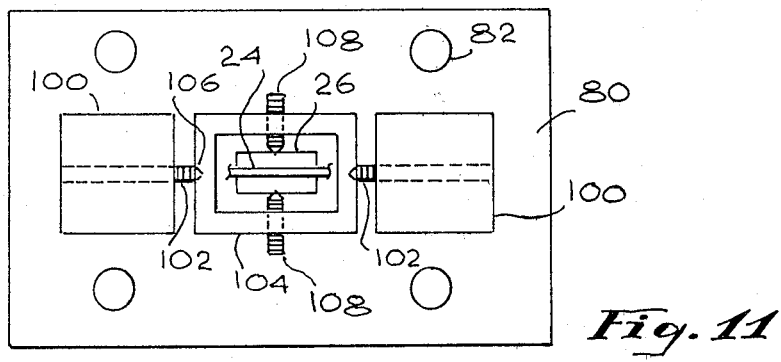
FIG. 11 is a top view of the universal apparatus of FIG. 10.

In the second adjustable support structure 60, fiber mount 26 is positioned in universal mounting 70, as shown in FIGS. 10-12, and bolted or otherwise attached to mounting bracket 78 through base plate 80 and bolt holes 82. Mounting bracket 78 is "L" shaped in cross section and, preferably, is provided with a brace or support in order to insure continued appropriate vertical alignment without major adjustments and thus provide reproducible results. Bracket 78 is in turn bolted, screwed, or otherwise affixed to the second rotational adjuster 84, as better shown in FIG. 9, which is provided with micrometer screw 86. Micrometer screw 86 mates with splined shaft 88, not shown in FIG. 9, which is an extension of secondary planar adjuster 90. The rotation of micrometer screw 86 in view of its offset relationship shown in FIG. 10, results in small rotations of fiber 24 about an axis defined by splined shaft 88. The rotation shown is in a horizontal plane. Secondary planar adjuster 90, used for fine adjustments in the horizontal plane, is provided with micrometer screw 92 which moves planar adjuster 90 in the direction of the shaft of the screw by conventional guides and a screw drive. This portion of the unit performs the longitudinal adjustment, i.e. that along the axes of the fibers, as previously discussed. In addition, adjusting unit 90 is provided with a second micrometer adjusting structure including screw 94, which functions in the same manner as the others, and moves the fibers toward and away from each other for fine adjustment. This fine adjustment may be necessitated by the rotational and/or other adjustments resulting in a lack of contact between the two surfaces of the fibers.

Adjusting unit 90 is attached to base 96 by suitable tracks or other means, not shown, to allow the aforesaid adjustments. Base 96 is also provided with adjusting screw 98 and an internal adjusting structure, not shown. In particular this adjustment is most preferably performed by making screw 98 a micrometer screw, and providing, for instance, a scissors structure internally pivotably attached at its top to base 96 with the support means physically attached at the bottom and micrometer screw 98 threaded through pivotable attachments on the two sides of the thus-formed diamond configuration. The result is that the turning of screw 98 in one direction would raise base 96 and turning in the other direction would lower base 96.

In particular, rotation of the fibers in the apparatus of the present invention must be effected at first adjusting structure 69. However, the other fine adjustments of the unit may be effected on either side. Thus axial adjustment, available through micrometer screws 68 and 98, may be effected by only one of the micrometer screws, although both are preferred in order to insure fine adjustment. Likewise micrometer screw 66 and micrometer screw 92 are both available to perform the longitudinal adjustment, but only one is necessary. However, as in the above situation, for very fine adjustments both screws should be provided. Rotational adjustment in the vertical plane, on the other hand, can be effected by the use of micrometer screw 72. Also, coarse rotational adjustment in the horizontal plane can optionally be provided through screw 86. However, since the universal structure performs the adjustment as well, screw 86 is used to coarse position the fibers within the range of universal 70, and micrometer screw 94 is then turned to bring the fibers into contact.

With regard to the universal mounting system, FIGS. 10, 11 and 12 show base plate 80 having bolt holes 82, and a pair of mounting projections 100 provided with set screws 102 which are opposite each other. Set screws 102 are used to snugly position central mounting block 104 through indentations 106, as best seen in FIG. 11. The result is that mounting block 104 is not normally mobile, but under slight pressure may rotate about the axis produced by extending the axes of set screws 102. The set screws may be provided with further threaded elements to lock the set screws in position during operation. Mounting block 104 is also provided with a pair of set screws 108 (see FIGS. 11 and 12) which are threaded and turned into block 26 to position fiber 24 in place. Set screws 108 are snugged up against fiber holder 26 to prevent free rotation and to allow rotation about the axis defined by the set screws upon the application of small amounts of pressure. In this manner a universal-joint mounting is provided. That is, fiber 24 is positioned such that it may rotate about two axes, and thus one of the planar surfaces shown in FIG. 4 can be mated against the planar surface provided on fiber 20.

After the fibers have been aligned on epoxy resin, which is optically clear after setting, is applied to the joined surfaces. The preferred form would fill the gap between epoxy surfaces 39, shown in FIG. 7. In this light, additionally, a vertically adjustable resin retaining structure can be provided and placed on stand 52 during or after alignment. The retainer is positioned so that it surrounds, or is in close proximity to, fibers 20 and 24, and prevents the resin from falling onto the surface of stand 52. However, generally, the thickness of the epoxy resin makes this particular step unnecessary.

In operation, lapped and mounted fibers 20 and 24 are positioned in mounting block 76 and universal mounting 70, with the mounting 70 being optionally removable by removing bolts positioned in holes 82 in order to facilitate easy mounting. After mounting is effected, rough vertical adjustment may be preformed utilizing micrometer screw 62. Then micrometer screw 94 is turned to cause the two fibers to contact each other, and planar contact is established by virtue of the automatic motion of universal structure 70. After establishing this normally planar contact, a laser beam, mentioned previously, is shown through a selected fiber, and the output sensed by a photosensitive element to measure the amount of light transmitted. Then in sequence, or with a plurality of fine adjustments, the axial alignment is performed utilizing micrometer screw 68 and/or micrometer jack screw 98. Longitudinal alignment is effected utilizing micrometer screw 66, micrometer screw 92, or both. Rotational alignment is effected at least by using micrometer screw 72 and, optionally, by utilizing micrometer screw 86. It should be noted that rotational adjustment by micrometer screw 86 is somewhat duplicated by universal 70, and the above duplication of vertical and horizontal adjustments is effected in the most preferred form, in order to further maximize the efficiency of the coupler. After each of the above adjustments is made and maximum light throughput obtained, it is preferred that each of the adjustments be rechecked in the order that they were originally performed. This is done in order to verify that none of the subsequent adjustments modified a prior adjustment and, of course, that slippage or other misalignment has not occurred. In this manner, maximum optical transmission may be obtained, and maximum coupler efficiency may be realized in accordance with the present invention.

Although there have been described above specific arrangements of an apparatus and a method for aligning and producing optical couplers in accordance with the present invention for the purpose of illustrating the manner in which the invention may be used to advantage, it will be appreciated that the invention is not limited thereto. For example, although the invention has been disclosed in the context of association with a unidirectional launch coupler utilizing different size fibers, the principles of the invention are equally applicable to bi-directional launch couplers, couplers utilizing equal diameter fibers, and the like. Accordingly, any and all modifications, variations or equivalent arrangements which may occur to those skilled in the art should be considered to be within the scope of this invention as defined in the appended claims.

What is claimed is:

1. A method for longitudinally aligning plural elongate structures comprising;
   providing structures with mounting faces thereon;
   mounting a first structure on a universal joint having pivot axes in two orthogonal directions;
   mounting the universal joint on a first stand which is adjustable in three orthogonal linear directions;
   mounting a second structure on a second stand which is adjustable about at least one axis of rotation orthogonal to the two pivot axes;
   adjusting at least the first stand to bring the faces of the structures into contact;
   adjusting at least one of the stands to rotate at least one of the structures to align the axes thereof in a first plane; and
   adjusting at least one of the stands to develop relative movement of the structures in a second plane generally othogonal to the first plane while allowing the universal joint to adjust the first structure to align the faces in a mating relationship.

2. The method of claim 1 wherein the step of bringing the structures into contact is effective to pivot the first structure on the universal joint and initiate the planar aligning process.

3. The method of claim 1 wherein the second structure is rotated during the rotational alignment step.

4. The method of claim 3 wherein both of the structures are rotated.

5. The method of claim 1 further comprising moving the second structure in a plane perpendicular to the rotation axis after the rotation thereof.

6. The method of claim 1 wherein the second structure is brought into contact with the first structure by relative transverse motion prior to rotation.

7. The method of claim 1 wherein the first structure is rotated during alignment.

8. The method of claim 7 wherein transverse alignment is further effected on the first structure.

9. The method of claim 8 further comprising aligning the universal joint in a plane perpendicular to the transverse aligning.

10. A method for longitudinally aligning optical fiber junctions comprising:
    providing two optical fibers with relatively flat mating faces thereon;
    mounting a first optical fiber on a universal joint having pivot axes in two orthogonal directions;
    mounting the universal joint on a first stand which is adjustable in three orthogonal linear directions;
    mounting a second optical fiber on a second stand which is adjustable about at least one axis of rotation orthogonal to the two pivot axes;
    adjusting at least one of the stands to bring the faces of the fibers into contact while allowing the universal joint to adjust the orientation of the first fiber;
    adjusting the stands to rotate the fibers to align the faces thereof in a plane; and
    adjusting at least one of the stands to develop relative movement of the fibers in the plane to align the faces in a mating relationship.

11. The method of claim 10 wherein the step of bringing the optical fibers into contact is effective to pivot the first optical fiber on the universal joint and initiate the planar aligning process.

12. The method of claim 10 wherein the second optical fiber is rotated during the rotational alignment step.

13. The method of claim 12 wherein both of the optical fibers are rotated during the rotational alignment step.

14. The method of claim 10 further comprising moving the second optical fiber in a plane perpendicular to the rotation axis after the rotation thereof.

15. The method of claim 10 wherein the second optical fiber is brought into contact with the first optical fiber by linear motion prior to rotation.

16. The method of claim 10 wherein the first optical fiber is rotated during alignment.

17. The method of claim 16 wherein transverse alignment is further effected on the first optical fiber.

18. The method of claim 17 further comprising aligning the universal joint in a plane perpendicular to the transverse aligning.

19. The method of claim 18 wherein the fibers are adhered together subsequent to the alignment.

20. The method of claim 19 wherein the adhering step is effected with a curable resin, and the resin is cured prior to removal of the resulting structure from the universal joint and adjustable stand.

21. The method of claim 10 further including the steps of applying a light beam as input to a selected one of the optical fibers and monitoring light out of the other fiber during the alignment steps to maximize the coupling between the two fibers achieved during alignment.

22. An aligning apparatus for plural elongate structures comprising:

a first base;

means for positioning a first elongate structure on the base;

adjusting means interconnecting the base and the positioning means capable of rotating said elongate structure about a first axis;

a second base;

means for adjustably interconnecting a second elongate structure with the second base including means for moving the second structure into contact with the first structure; and means for moving the elongate structures in relation to each other in a junction plane defined by the structures; the adjustable interconnecting means further including a universal joint fixture allowing rotation of the second structure about second and third axes, whereby when said elongate structures are brought into lateral contact with each other the fixture adjusts to produce planar contact between the structures.

23. The apparatus of claim 1 wherein additional adjusting means are provided between the first base and the first elongate structure for moving the structure axially.

24. The apparatus of claim 23 wherein the additional adjusting means provides adjustments in a plane perpendicular to the axis of rotation of the first elongate structure.

25. The apparatus of claim 1 further comprising means adjustable both linearly and rotatably interconnecting the fixture to the second base.

26. The apparatus of claim 25 wherein the linearly adjustable means allows for adjustment in three orthogonal directions.

27. The apparatus of claim 1 wherein the universal joint fixture comprises a first pair of spaced-apart arms attached at one end thereof to the adjusting means on the second base, and each having positioning means on the other end thereof extending therebetween and contacting a housing, whereby the housing is pivotable about an axis produced by the positioning means, and wherein the housing contains a pair of elongate structure positioners pivotally positioning the elongate structure in the housing on a second axis produced by the positioners, the two pivotal axes being perpendicular to each other.

28. The apparatus of claim 1 additionally comprising a vertically adjustable stand between the interspersed first base and the means for positioning the first elongate structure.

29. An aligning apparatus for optical fiber junctions comprising:

a first base;

means for adjustably positioning a first fiber on the base;

first adjusting means interconnecting the first base and the positioning means capable of rotating the fiber about a first axis;

second adjusting means interconnected to said second base; and a universal joint fixture having means for mounting a second fiber thereon and rotatable about second and third axes mutually orthogonal with said first axis, the fixture being attached to the second adjusting means; whereby when the second adjusting means are positioned to bring the fibers into contact with each other, the fixture permits aligned planar contact between the fibers, and the adjusting means are operable to maximize the planar contact.

30. The apparatus of claim 29 wherein the fixture comprises plural spaced-apart arms attached to the second adjusting means, a housing pivotally located between the arms by first pivotable positioning means spaced between the arms in the housing, and second pivotable positioning means capable of pivotally retaining the second fiber in the housing, the two pivots produced by the first pivotable positioning means and the second pivotable positioning means being perpendicular to each other.

31. The apparatus of claim 29 wherein said first base further includes a vertical stand, and means thereon to vertically position the first fiber adjustable positioning means.

32. The apparatus of claim 31 further comprising means interspersed between the first adjusting means and the vertical positioning means for adjusting the position of the fiber.

33. The apparatus of claim 32 wherein the means interspersed between the linearly adjusting means and the vertical positioning means is capable of moving the fiber within a plane perpendicular to the axis of rotation of the adjusting means.

34. The apparatus of claim 29 wherein the second base is vertically adjustable.

35. The apparatus of claim 34 wherein additional rotational means, capable of rotating the second fiber about a second axis of rotation perpendicular to the rotation in the first adjusting means, is interspersed betwee the second base and the second fiber.

36. The apparatus of claim 35 further comprising planar adjusting means perpendicular to the vertical adjustment in the second base positioned between the second base and the additional rotational means, capable of moving the second fiber in a planar orientation perpendicular to said second vertical adjustment.

* * * * *